United States Patent
Boursier

(10) Patent No.: US 10,239,289 B2
(45) Date of Patent: Mar. 26, 2019

(54) MULTI-COMPONENT COMPOSITE STRUCTURES

(71) Applicant: Hexcel Corporation, Dublin, CA (US)

(72) Inventor: Bruno Boursier, Dublin, CA (US)

(73) Assignee: HEXCEL CORPORATION, Dublin, CA (US)

( * ) Notice: Subject to any disclaimer, the term of this patent is extended or adjusted under 35 U.S.C. 154(b) by 890 days.

(21) Appl. No.: 13/861,652

(22) Filed: Apr. 12, 2013

(65) Prior Publication Data

US 2015/0375481 A1 Dec. 31, 2015

(51) Int. Cl.

| | |
|---|---|
| *B32B 27/08* | (2006.01) |
| *B29C 43/18* | (2006.01) |
| *B32B 5/02* | (2006.01) |
| *B32B 5/12* | (2006.01) |
| *B32B 3/08* | (2006.01) |
| *B32B 27/38* | (2006.01) |
| *B29C 70/42* | (2006.01) |
| *B29C 70/08* | (2006.01) |

(Continued)

(52) U.S. Cl.
CPC .............. *B32B 27/08* (2013.01); *B29C 43/18* (2013.01); *B29C 70/081* (2013.01); *B29C 70/083* (2013.01); *B29C 70/42* (2013.01); *B32B 3/08* (2013.01); *B32B 5/024* (2013.01); *B32B 5/12* (2013.01); *B32B 27/38* (2013.01); *B29C 2043/181* (2013.01); *B29L 2009/00* (2013.01); *B29L 2031/005* (2013.01); *B32B 2262/106* (2013.01); *B32B 2307/738* (2013.01); *B32B 2605/18* (2013.01)

(58) Field of Classification Search
CPC ... Y10T 428/24994; Y10T 428/249924; Y10T 428/249921; Y10T 428/249947; D04H 13/00; B29B 11/16; B29K 2707/04; B29C 70/887; B29C 70/081
USPC ...................................... 264/271.1
See application file for complete search history.

(56) References Cited

U.S. PATENT DOCUMENTS 3,926,903 A * 12/1975 Scola ..................... C08G 59/24
                                                       523/437
4,051,290 A    9/1977 Jutte et al.
(Continued)

FOREIGN PATENT DOCUMENTS

WO          93/023236        11/1993
WO     WO 2012072405 A1 *   6/2012  ............. B29B 11/16

OTHER PUBLICATIONS

US 4,367,260, 01/1983, Krause (withdrawn)
(Continued)

*Primary Examiner* — Frank J Vineis
*Assistant Examiner* — Michael Zhang
(74) *Attorney, Agent, or Firm* — W. Mark Bielawski; David J. Oldenkamp

(57) ABSTRACT

A composite assembly that can be cured to form a multi-component composite structure which does not have micro cracks along the boundaries between the various components. The composite assembly includes a structural component and a moldable component wherein the coefficients of thermal expansion of the structural component and the moldable component at the interface or boundary between the two components are such that micro cracks do not form along the interface when the composite assembly is cured to form the multi-component composite structure.

14 Claims, 4 Drawing Sheets

(51) Int. Cl.
*B29L 9/00* (2006.01)
*B29L 31/00* (2006.01)

(56) References Cited

U.S. PATENT DOCUMENTS

| | | | | |
|---|---|---|---|---|
| 4,536,438 A * | 8/1985 | Bishop | ............... | B29C 70/083 |
| | | | | 428/367 |
| 4,921,558 A * | 5/1990 | Johnson | ............... | C08J 5/042 |
| | | | | 156/161 |
| 4,937,032 A * | 6/1990 | Krone | ............... | B29C 70/08 |
| | | | | 156/242 |
| 5,939,007 A * | 8/1999 | Iszczyszyn | ............... | B29C 70/32 |
| | | | | 156/156 |
| 5,948,330 A * | 9/1999 | Rivers | ............... | C04B 35/83 |
| | | | | 264/162 |
| 7,510,390 B2 | 3/2009 | Callis | | |
| 7,960,674 B2 | 6/2011 | Boursier et al. | | |
| 8,327,738 B2 * | 12/2012 | Davis | ............... | F16H 57/033 |
| | | | | 244/17.11 |
| 2002/0031641 A1 * | 3/2002 | George | ............... | B32B 5/12 |
| | | | | 428/105 |
| 2004/0175533 A1 | 9/2004 | Yamane et al. | | |
| 2006/0284009 A1 | 12/2006 | Kismarton | | |
| 2007/0243368 A1 * | 10/2007 | Edwards | ............... | B29C 70/081 |
| | | | | 428/292.1 |
| 2008/0054122 A1 * | 3/2008 | Bold | ............... | B29C 70/48 |
| | | | | 244/129.3 |
| 2008/0197237 A1 * | 8/2008 | Bold | ............... | B29C 70/48 |
| | | | | 244/129.3 |
| 2010/0108812 A1 * | 5/2010 | Boursier | ............... | B29C 70/30 |
| | | | | 244/129.3 |
| 2010/0173143 A1 | 7/2010 | Beraud et al. | | |
| 2010/0173152 A1 | 7/2010 | Beraud et al. | | |
| 2011/0294963 A1 * | 12/2011 | Kuan | ............... | C08G 18/5024 |
| | | | | 525/452 |
| 2012/0040169 A1 * | 2/2012 | Boursier | ............... | B32B 5/022 |
| | | | | 428/223 |
| 2013/0244018 A1 * | 9/2013 | Wohlmann | ............... | B29B 11/16 |
| | | | | 428/299.7 |
| 2016/0083535 A1 * | 3/2016 | Wilenski | ............... | C08J 5/04 |
| | | | | 442/59 |

OTHER PUBLICATIONS

Poveda, Ronald L., Sriniket Achar, and Nikhil Gupta. "Thermal expansion of carbon nanofiber-reinforced multiscale polymer composites." Jom 64.10 (2012): 1148-1157.*

* cited by examiner

MULTI-COMPONENT COMPOSITE STRUCTURES

BACKGROUND OF THE INVENTION

1. Field of the Invention

The present invention relates generally to multi-component or hybrid composite structures that are made by molding uncured composite assemblies which are composed of a structural component that is embedded within a moldable component. The combination of a structural component with a moldable component allows one to take advantage of the added strength provided by the structural component while still being able to form composite structures that have relatively complex shapes. More particularly, the present invention is directed to eliminating the micro cracks that tend to form along the interfaces between the structural component and the moldable component during molding of the uncured composite assembly.

2. Description of Related Art

Composite materials typically include fibers and a resin matrix as the two principal components. Composite materials typically have a rather high strength to weight ratio. As a result, composite materials are being used in demanding environments, such as in the field of aerospace where the high strength and relatively light weight of composite parts are of particular importance.

A discontinuous fiber composite (DFC) material has been developed that can be accurately molded and machined to form a wide variety of relatively complex structures. This composite material is composed of randomly oriented segments of unidirectional tape that have been impregnated with thermosetting resin. This type of quasi-isotropic fiber material has been used to make molds and a variety of aerospace components. The material is available from Hexcel Corporation (Dublin, Calif.) under the trade name HexMC®. Examples of the types of parts that have been made using HexMC® are described in U.S. Pat. Nos. 7,510,390; 7,960,674 and published US Patent Application US2012-0040169-A1, the contents of which are hereby incorporated by reference.

The fibers used in many load-bearing composite structures or elements are unidirectional and continuous. Such unidirectional (UD) fibers are particularly useful when the load-bearing structure is relatively long with respect to the width and thickness of the structure. Wing spars, struts, links, frames, intercostals, beams, skins, panels, jet engine blades and vanes are examples of various aircraft structures that can be relatively long and which are designed to carry significant loads.

UD fibers are generally provided as a tape or layer of parallel continuous fiber that may or may not be impregnated with thermosetting resin. The tape or layer of UD fibers has a width and a thickness with the fibers extending unidirectionally in the length direction. The UD fiber layer can generally be shaped into curved structures provided that the tape is bent in the thickness direction. It is much more difficult to form curved structures in which the UD fiber layer is bent in the direction of the width of the UD layer. Procedures have been developed to allow a UD fiber layer to be bent in the width direction. Such procedures involve twisting the UD fibers prior to bending the UD layer in the width direction. Such procedures are described in published US Patent Applications US2010-0173143-A1 and US2010-0173152-A1 the contents of which is hereby incorporated by reference. These bending procedures allow one to form LID fiber layers into strong structural parts that have some curvature in the thickness and/or width directions. However, it remains difficult to form complex machinable structures using only UD fiber layers.

DFC material is entirely suitable for use in those situations where the desired composite structure has a relatively complex shape and/or requires post-curing machining. However, there are many situations where it is desirable to reinforce one or more sections of the DFC structure with continuous UD fibers. Such multi-component or hybrid composite structures are composed of DFC material, as the moldable component, and continuous UD fibers as the structural component. The UD fibers are embedded within the DFC material to provide structural reinforcement in those areas of the structure that require the extra strength which is provided by continuous UD fibers.

DFC/UD hybrid composite structures are generally made by first forming an uncured composite assembly that includes continuous UD fibers as the structural component of the assembly and DFC material as the moldable component. This assembly is cured in a mold under high pressure at an elevated temperature to produce a multi-component composite structure. The structural component can be made up of one or more UD structural elements that are placed strategically within the structure to provide the desired degree of reinforcement for the moldable component.

DFC material and continuous UD fiber layers tend to expand at different rates as the materials are heated and cured during the molding process. The rate at which these materials expand during molding is expressed as the coefficient of thermal expansion (CTE). The micro cracking that may occur along the interfaces or boundaries between the various components is a major concern when molding hybrid composite assemblies to form multi-component composite structures. Micro cracking becomes more of an issue as the difference in CTE between the various components increases. The difference in CTE between DFC material and UD fiber layers is sufficiently large that micro cracking can become a problem when these two components are combined for molding into multi-component composite structures.

It would be desirable to provide methods for making multi-component structures from DEC materials and UD fibers where micro cracking along the interfaces between the two materials is avoided during high temperature molding. Elimination of micro cracking is especially an issue in those situations where multiple UD structural elements are combined with DFC material and molded to form the hybrid structure.

SUMMARY OF THE INVENTION

In accordance with the present invention, it was discovered that uncured composite assemblies, which contain a moldable component that is reinforced with a structural component, can be molded to form multi-component structures that do not have micro cracks along the interfaces between the two components. The invention is based in part on the discovery that the size, shape and CTE of the structural component can be controlled such that micro crack formation during the molding process does not occur along the interfaces between the components.

The present invention is directed to composite assemblies that can be cured to form multi-component composite structures. The composite assembly includes a structural component which is composed of one or more structural elements. Each structural element includes uncured thermosetting resin and unidirectional continuous fibers.

The composite assembly also includes a moldable component which is composed of a moldable body that includes an uncured thermosetting resin and discontinuous fibers. As a feature of the present invention, the coefficient of thermal expansion of the structural component and the moldable component, at the interface between the two components, is such that micro cracks do not form along the interface when said composite assembly is cured to form the multi-component composite structure.

As another feature of the present invention, the CTE of the structural component is made to more closely match the CTE of the moldable component by including multi-directional continuous fibers in the structural component. Multi-directional continuous fibers tend to have a CTE that more closely matches the CTE of the moldable component. The multi-directional continuous fibers can be distributed throughout the structural component to provide a structural component with a relatively uniform CTE. The multi-directional continuous fibers may also be concentrated near the interface with the moldable component to act as a CTE "buffer" between the UD fibers and the DFC molding material.

The invention is particularly useful for making multi-component structures where the structural component is composed of multiple structural elements embedded within the moldable component. The use of multiple structural elements increases the complexity and number of the interfaces between the structural component and moldable component. The present invention is designed to avoid the formation of micro cracks that typically form in such complex, multi-interface hybrid structures.

The above described and many other features and attendant advantages of the present invention will become better understood by reference to the following detailed description when taken in conjunction with the accompanying drawings.

DESCRIPTION OF THE INVENTION

The present invention may be used in a wide variety of situations where it is desirable to combine unidirectional fibers with a moldable composite material to form multi-component or hybrid composite structures. Such hybrid composite structures are useful in situations where the combination of strength provided by the unidirectional fibers and moldability/machinability provided by the composite molding compound is required. The invention is applicable to any situation where a relatively strong structure is required that has a complex shape.

Figure 3:
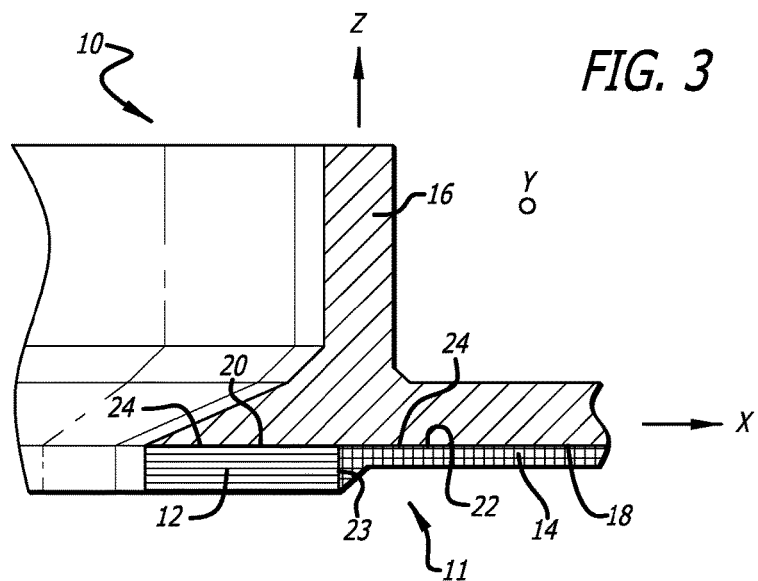
FIG. 3 is a sectional view representation of the exemplary composite assembly shown in FIG. 1.

The invention is particularly applicable to hybrid aircraft structures which require the use of molding compounds in combination with unidirectional fiber reinforcements to meet both strength and dimensional tolerances. Exemplary aircraft structures include window frames, access opening covers, outlet guide vanes for jet engines, thrust reverser cascades, various engine airfoils, access doors, brackets, fittings, gussets, clips/cleats, intercostals, pans, flanges and stiffeners for aerospace structures An exemplary uncured composite assembly is shown at 10 in FIGS. 1 and 3. The composite assembly is shown as it looks once it is placed within a suitable mold (not shown) and formed into its final shape prior to being molded at an elevated temperature under a relatively high pressure to form a multi-component composite structure. As shown in FIG. 3, the composite assembly 10 includes a structural component 11 that is made up of a structural element that is composed of a UD fiber body 12 and multi-directional continuous fiber body 14. The composite assembly 10 further includes a moldable component 16. The moldable component 16 has a face 18. The structural component 11 has a face that is made up of the face 20 of the UD fiber body 12 and the face 22 of the multi-directional fiber body 14. The meeting of the moldable component face 18 with the two faces 20 and 22 of the structural component forms the interface 24 between the moldable and structural components.

Figure 1:
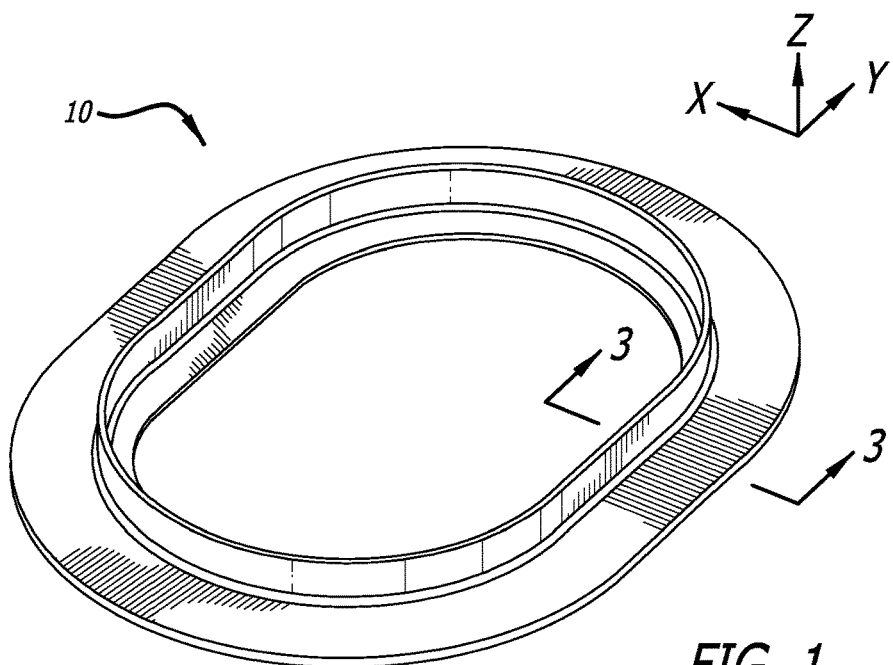
FIG. 1 is a perspective view of an exemplary uncured composite assembly after it has been placed into a mold (not shown) and formed into its final shape prior to being cured under elevated temperature and high pressure to form an aircraft window frame which is a multi-component composite structure in accordance with the present invention.

The uncured composite assembly 10 is formed from a preform in which the molding compound is located on top of the structural component. An exemplary preform is shown at 10a in FIG. 7. In the preform 10a, the amount of molding compound 16a that is located on the structural component 11a is sufficient to ensure that the molding compound 16a will flow within the mold, as represented by arrow 15, to fill the mold cavity 16P (shown in phantom) as the preform 10a is being formed into its final shape as shown in FIGS. 1 and 3. There can be substantial movement of the molding compound when the preform is placed within the mold. However, the structural elements 12a and 14a are located in the preform such that they do not move to any significant degree when the preform 10a is placed within the mold and formed into its final shape prior to curing. This allows one to accurately place the structural elements within the part while at the same time including the molding compound, which is allowed to move as needed in the mold to form the desired final shape.

Figure 7:
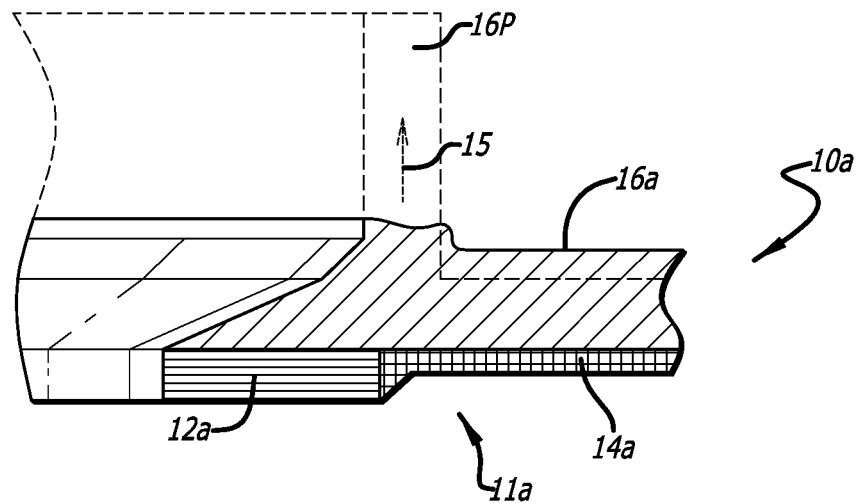
FIG. 7 is a sectional view of a preform prior to the preform being placed in a mold and formed into its final shape for molding to form the exemplary composite assembly shown in FIGS. 1 and 3.

The molding compound 16 can be preformed prior to placement in the mold so that it closely matches the shape of the final composite structure. However, it is difficult to accurately form a preform that matches the shape shown in FIGS. 1 and 3 where an elliptical wall extends perpendicularly from a base plate. Accordingly, it is preferred that the molding compound 16a simply be located on the structural elements 12a and 14a, as shown in FIG. 7, with the mold being used to form the molding compound 16a and structural elements 12a and 14a into the desired final shape of the composite assembly 10. Once in the mold, the principal difference between the composite assembly 10 and the resulting aircraft window frame is that the thermosetting resin present in the uncured assembly 10 must be completely cured.

In accordance with the present invention, the coefficient of thermal expansion (CTE) of the moldable component at the interface 24 and the CTE of the structural component at the interface 24 are such that micro cracks do not form along the interface when the composite assembly 10 is cured/molded. The CTE's of the two components at the interface 24 must be sufficiently close to each other so that micro cracks do not form. Micro cracks typically form when the CTE of two adjoining materials differ, at least in one direction, creating a local strain from expansion or contraction that exceeds the materials ability to resist cracking. The CTE of the UD fiber body 12 and multi-directional fiber body 14, as well as the size, shape and relative orientation of the two bodies must be taken into consideration when designing a composite assembly that can be molded without micro cracking.

In general, larger structural components should have a CTE that more closely matches the CTE of the moldable component. Likewise, interfaces that are larger and/or more complex require that the structural component have a CTE at the interface that more closely matches the CTE of the moldable component. For any given combination of structural and moldable components, the difference in CTE's that can be tolerated without molding-induced micro cracking is determinable by routine experimentation.

The molding compounds and structural elements that are used in accordance with the present invention are composed of fibers and resin. Fibers, such as carbon fibers, have a CTE (parts per million/° C.) that is close to zero. Accordingly, the majority of the CTE of a composite material is due to expansion and contraction of the resin matrix. In bulk molding compounds, where the fibers are discontinuous and randomly oriented, the CTE tends to be uniform in all directions. For sheets of molding compound where the fibers are quasi-isotropically oriented, the CTE is uniform in all planar directions. The planar CTE of a typical sheet of quasi-isotropic carbon fiber/epoxy molding compound is on the order of 2-4 ppm/° C. The CTE in a direction perpendicular to the plane of the sheet of molding compound is controlled more by the resin matrix and tends to be higher than the planar CTE's. CTE's in the perpendicular direction are typically on the order of 20 to 40 ppm/° C. for a sheet of quasi-isotropic molding compound.

The CTE for structural elements is highly dependent upon the direction of the fibers. For example, the CTE of UD prepreg in the direction parallel to the fibers (X direction) is due mainly to the fiber. The matrix resin contributes very little to the CTE. As a result, the CTE of UD prepreg in the X direction is close to zero. The CTE of an exemplary carbon fiber/epoxy UD prepreg in the X direction is 0.01 ppm/° C. The CTE of the same UD prepreg in the direction perpendicular to the UD fibers (Y and Z directions) is 30-40 ppm/° C., which is due mainly to the CTE of the resin matrix.

Structural components made from woven fibers also exhibit CTE's that vary due to the orientation of the fibers. However, the differences between X, Y and Z direction CTE's is not as great as in UD prepreg, since all of the fibers are not parallel to each other. The CTE in the X and Y direction of woven fiber prepreg tends to be controlled more by the matrix resin as compared to UD prepreg in the X direction. As a result, the CTE's in the X and Y direction of woven prepreg generally lie somewhere between the CTE of a similar UD prepreg in the X direction and the CTE of the UD prepreg in the Y/Z direction. The CTE of woven fiber prepreg in the Z direction is similar to the CTE of a similar UD prepreg in the Z direction, since the matrix resin in both types of prepreg contributes to the Z-direction CTE in a similar manner.

The CTE of a molding component or structural component is measured using conventional procedures after complete curing of the individual components. The components contract as they cool and expand as they are heated. Micro cracks can form during either contraction or expansion of the components. The CTE of the components, as measured after complete curing of the component, is considered to also be a measure of the thermal contraction that occurs during cooling of the component from molding/curing temperature. In practice, the curing temperature of the component is most likely the highest temperature to which the component is exposed during the life of the component. The contraction that occurs during the initial cool down of the molded part can be a source of considerable strain between the various components which does result in micro cracking when the strain exceeds the ability of the components to resist cracking.

The CTE of continuous multi-directional fibers tends to more closely match the CTE of DFC material than UD fiber layers, provided that the resin matrices are the same or similar. The multi-directional fiber body 14 is composed mainly of woven fibers so that the CTE of the fiber body 14 is relatively close to the CTE of the moldable component 16 at the interface 24. Accordingly, the risk of micro cracking along the interface between the multi-directional fiber body 14 and moldable component 16 is minimal. However, if the UD fiber body 12 is composed only of UD fiber layers, then the risk of micro cracking increases due to the increased difference in CTE between the DFC material of the moldable component and the body made up entirely of UD fibers. This is especially a problem in the Z direction relative to the UD fiber body due to the relatively high CTE of the UD fiber body in this direction, which is driven by the CTE of the resin matrix. Locating the UD fiber body 12 along the surface of the assembly allows for this added strain to occur in the Z direction without causing micro cracking. The UD fiber body 12 is in the form of an ellipse in the X-Y plane. The CTE in this direction is due mainly to the UD fibers, so that the CTE is lower than in the Z direction. The expansion or contraction (for example during the cure cycle cool down phase) in the X-Y plane is also restrained by the surrounding molding compound.

Figure 4:
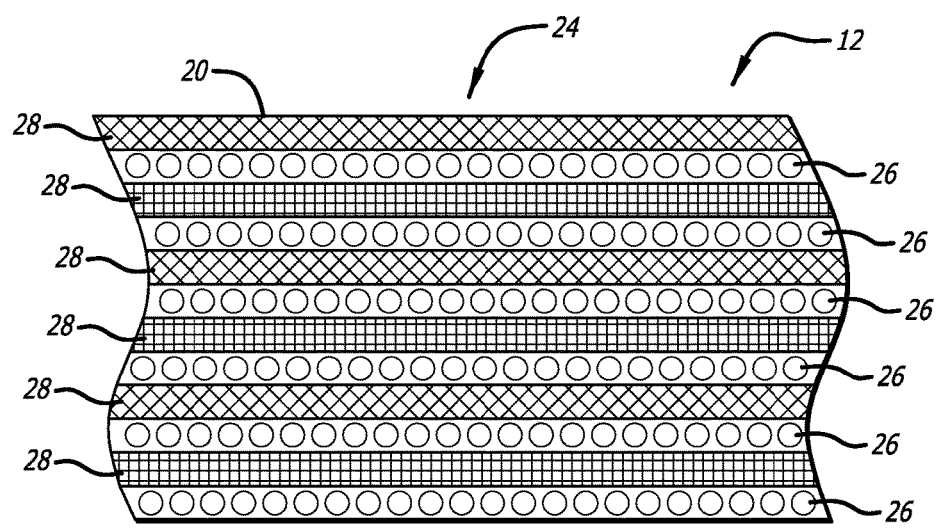
FIG. 4 is a sectional view representation of an exemplary structural element in accordance with the present invention where layers of continuous UD fibers are alternated with layers of multidirectional continuous fibers to provide a structural component that contains UD fibers, but which also has a CTE that more closely matches the DFC material that makes up the moldable component.

In accordance with the present invention, the risk of micro cracking is substantially eliminated by insuring that the UD fiber body 12 is located in the assembly and oriented so that the directional CTE's of the UD fiber body 12 are close enough to the CTE of the moldable component to avoid micro cracking along the component interfaces. FIG. 4 shows a detailed representation of an exemplary UD fiber body 12 in which layers 26 of continuous UD fibers are alternated with layers 28 of multi-directional continuous fibers. The addition of multi-directional continuous fibers to the UD fiber body 12 changes the overall CTE of the body 12 so that it more closely matches the CTE of the moldable component 16. This provides a reduction in the potential for micro cracking, but also reduces the unidirectional nature of the fiber body. The number of layers of UD fibers and multi-directional fibers can be varied to provide the desired structural properties while maintaining CTE profiles that are sufficient to avoid micro cracking at the interface 24. It was found that the use of multi-directional fibers along the interface 24 is preferred because the CTE of the multi-directional fibers more closely matches the CTE of the random discontinuous fibers in the molding compound, hence reducing local strain at their resin interface.

In FIG. 4, the multi-direction continuous fiber layers 28 are intended to diagrammatically represent woven fibers layers wherein the fiber orientation relative to the UD fibers alternates between 0/90 and +45/−45. This is for exemplary purposes only. The woven fibers can be in a wide variety of orientations relative to the UD fibers and the various layers may have the same or different orientations. It is not necessary that the layers alternate between UD and woven fiber layers. It is preferred that one or more layers of woven fibers be located next to the interface 24 as shown in FIG. 4. The layer(s) of woven fibers act as a CTE buffer zone between the relatively low CTE moldable component and relatively high CET UD fiber layers.

The multi-directional fiber body 14 is located adjacent to the UD fiber body 12 to provide dissipation of CTE-induced stress during curing of the composite assembly 10. The joint 23 between the two bodies is located at a relative thick section of the assembly 10 with the two bodies extending laterally from each other into relatively thin sections of assembly 10. In an alternate orientation, the multi-directional fiber body 14 can be located between the UD fiber body 12 and the moldable component 16 to act as a CTE buffer. In either case, the multi-directional fiber body is located on the side of UD fiber body, which is the high CTE direction, as opposed to abutting the end of the UD fiber body, which is the low CTE direction.

Figure 5:
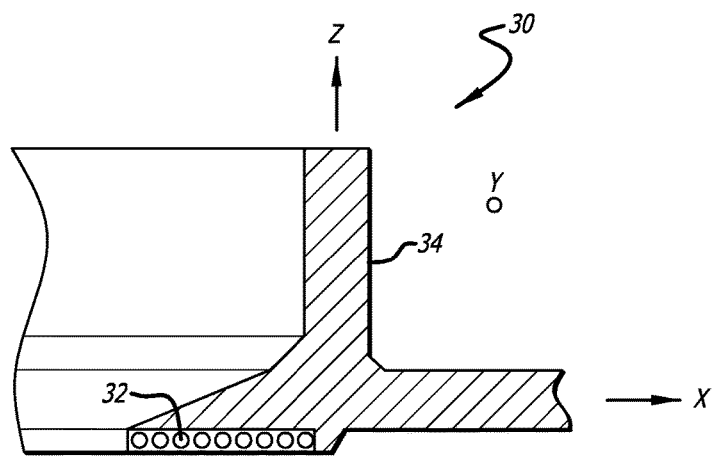
FIG. 5 is a sectional view representation of an alternate exemplary composite assembly that is located within a mold (not shown) prior to being cured to form an alternate aircraft window frame.

An alternate embodiment of a composite assembly that is used to form an exemplary window frame is shown at 30 in FIG. 5. In this embodiment, the structural component 32 is relatively thin, as compared to the structural component 11 shown in FIG. 3. The moldable component of the window frame is also composed of DFC material. The moldable component is shown at 34. In this embodiment, up to a few layers of continuous UD fiber layers are used to form the structural component. This relatively thin structural component can be molded with the DFC material to produce a window frame that is not micro cracked along the UD fiber/DFC material interface.

The high CTE direction of the structural component 32 is the Z-direction. The moldable component is located on only one side of the structural component 32. The difference in CTE between the DFC material and the UD fiber layer(s) in the Z-direction is chosen such that micro cracking does not occur during cool down of the molded part. The difference in CTE's can be relatively large since the fiber layer(s) are located at the surface of the part where thermal contraction/expansion can take place without micro cracking. The CTE in the X-Y plane is much less due to the fact that the UD fibers form a continuous loop that does not have an exposed end that forms an interface with the DFC material. This type of closed loop configuration is preferred over using multiple segments of UD fiber layers that form multiple interfaces at the ends of each segment.

If the combination of structural component thickness and CTE difference results in the formation of micro cracks during molding of the window frame 30, then it is preferred that multi-directional fibers be incorporated with the UD fiber layers in accordance with the embodiment shown in FIG. 4. Alternatively, one or more layers of woven fibers can be placed between the UD fiber layers 32 and the moldable component 34 to provide a CTE buffer between the two components.

Figure 8:
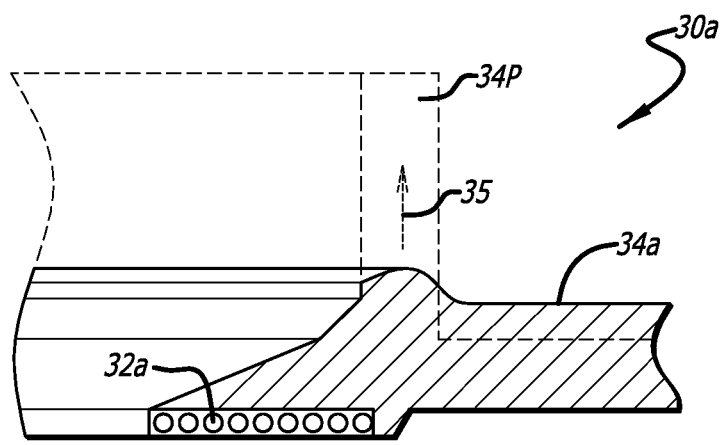
FIG. 8 is a sectional view of a preform prior to the preform being placed in a mold and formed into its final shape for molding to form the exemplary composite assembly shown in FIG. 5.

As shown in FIG. 8, it is preferred that a preform 30a be prepared in which the molding compound 34a is located adjacent to the UD fiber layer(s) 32a. The amount of molding compound 34a that is located on the UD fiber layers 32a is sufficient to ensure that the molding compound 34a will flow within the mold, as represented by arrow 35, to fill the mold cavity 34P (shown in phantom) as the preform 30a is being formed into its final shape as shown in FIG. 5. There can be substantial movement of the molding compound 34a when the preform is place within the mold. However, the UD fiber layer(s) 32a are located on the preform surface that is in contact with the mold bottom surface that is perpendicular to the direction of the press closure and pressure such that they do not move to any significant degree when the preform 30a is placed within the mold and formed into its final shape prior to molding. This allows one to accurately place the UD fiber layer(s) within the part while at the same time including the molding compound, which is allowed to move as needed in the mold to form the desired final shape.

As previously mentioned in connection with the embodiment shown in FIGS. 1 and 3, the molding compound 34 can be preformed prior to placement in the mold so that it closely matches the shape of the final composite structure. However, it also is difficult to accurately form a preform that matches the shape shown in FIG. 5 where an elliptical wall also extends perpendicularly from a base plate. Accordingly, it is preferred that the molding compound 34a simply be located on the structural elements 12a and 14a, as shown in FIG. 8, with the mold being used to form the molding compound 34a and UD fiber layer(s) 32a into the desired final shape of the composite assembly 30. Once in the mold, the principal difference between the composite assembly 30 and the resulting aircraft window frame is that the thermosetting resin present in the uncured assembly 30 must be completely cured.

It should be noted that the UD fiber layers shown in FIGS. 3 and 5 are bent in the width direction in order to form a planar reinforcing hoop within the molded window frame. In other words, the UD fibers form a co-planar layer in the X-Y plane and the UD fiber layer remains within the X-Y plane as it is bent to form the reinforcing hoop. This type of UD fiber hoop configuration is preferably made using the UD pre-twist procedure mentioned in the Description of Related Art.

Figure 2:
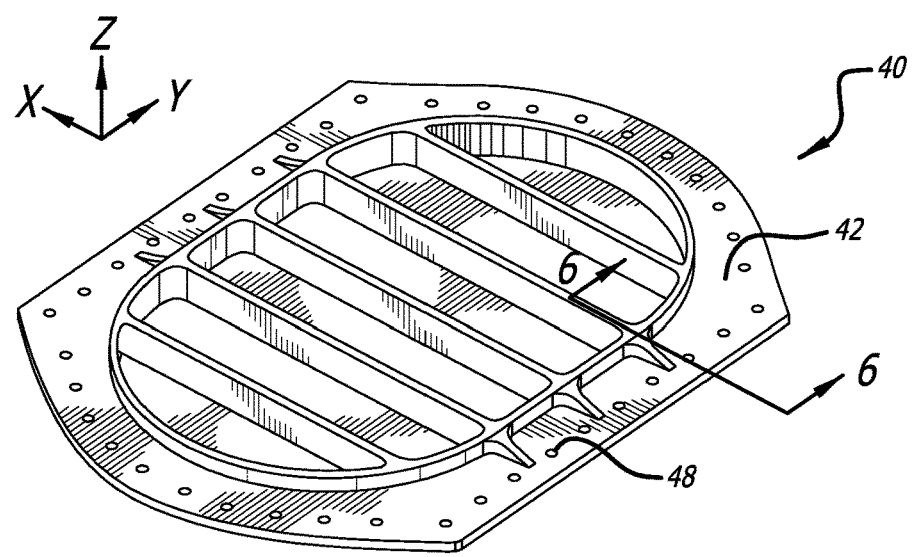
FIG. 2 is a perspective view of an exemplary composite assembly after it has been placed into a mold (not shown) and formed into its final shape prior to being cured under elevated temperature and high pressure to form an aircraft access opening cover which is a multi-component composite structure in accordance with the present invention. The uncured access opening cover is shown with attachment holes which are typically not present in the uncured composite assembly. The attachment holes are typically machined into the access opening after molding is completed.
Figure 6:
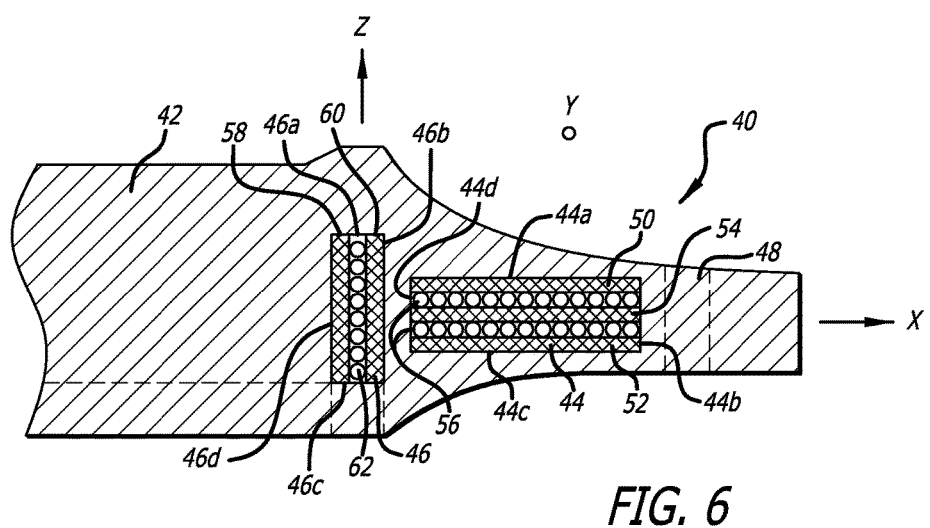
FIG. 6 is a sectional view representation of the exemplary composite assembly shown in FIG. 2.

An exemplary composite assembly that is molded to form a cover for an aircraft access opening is shown in FIGS. 2 and 6 at 40. The assembly 40 includes a moldable component 42, which is composed of DFC material and a structural component, which is made up of structural elements 44 and 46. Attachment holes 48 are shown in the composite assembly. These holes can be formed in the uncured composite assembly (as shown) or they can be drilled or otherwise machined into the multi-component structure after molding is completed.

The two structural elements 44 and 46 are completely surrounded by the molding component 42. Structural element 44 is in the form of a hoop that includes faces 44a, 44b, 44c and 44d, which form a tubular interface with the moldable component 42. This tubular interface has a rectangular cross section. Structural element 46 is also in the form of a hoop that includes faces 46a, 46b, 46c and 46d. The structural element 46 forms a second tubular interface with the moldable component 42. This second tubular interface also has a rectangular cross section.

The structural element 44 includes a combination of UD fiber layers represented at 56 and woven fiber layers represented at 50, 52 and 54. The structural element 46 is shown having a single UD fiber layer 62 sandwiched between woven fiber layers 58 and 60. The number and orientation of UD fiber layers and woven fiber layers in structural elements 44 and 46 are exemplary only. Other orientations with different numbers of layers are possible. For example, the structural elements of the type shown in FIG. 4 may be used. As previously mentioned, it is preferred that one or more layers of woven fibers be located between the UD fiber layers and the molding component in order to act as a CTE buffer between the UD fiber layers and the molding component.

The UD fiber layers that make up structural element 44 are bent in the width direction in the same manner as the UD structural elements shown in FIGS. 3 and 5. The UD fibers form a co-planar layer in the X-Y plane and they remain in the X-Y plane as the hoop is formed. As previously mentioned, this type of UD fiber hoop configuration is preferably made using the pre-twist process mentioned in the Description of Related Art. In contrast, the UD fiber layer in structural element 46 is bent in the thickness direction. The UD fibers form a layer that extends in the Z direction (substantially perpendicular to the UD fiber layers of element 44). The UD fiber reinforcing hoop is formed by bending the UD layer in the X-Y direction. This type of UD fiber hoop configuration is formed without the pre-twisting required for structural element 44. The CTE's of both types of UD fiber layers are similar in the direction perpendicular to the UD fibers as well as in the direction parallel to the UD fibers.

The use of multiple structural elements within the moldable component, as shown in FIG. 6, presents a relatively complex set of interfaces which increases the chances of micro crack formation. The present invention solves the micro cracking problem associated with multiple complex interface configurations by reducing the CTE differential between the structural elements and the molding component and/or by providing integral CTE buffers between the components. The UD fibers in adjacent structural elements 44 and 46 are preferably oriented in the same direction, as shown in FIG. 6, in order to match the directional CTE's of the UD fiber layers of the adjacent elements. Orienting the structural elements so that the UD fibers of adjacent elements are perpendicular to each other should be avoided due to the significant differences in directional CTE's that would be present at the interface or area between the two elements.

The uncured resin used in the DFC, UD fiber layers and/or multi-directional fiber layers may be composed of any of the thermosetting or thermoplastic resins that are typically used for structural applications. The resins in the three different fiber materials can be different. However, it is preferred that the resins that are used in the structural component and moldable component are the same or substantially similar to minimize CTE differences between the components. In addition, the resin should be chosen such that the strain to failure properties of the resin are sufficiently high to withstand the thermal strain to which adjacent components are subjected without forming micro cracks or otherwise failing. The fiber orientations and types are chosen, as discussed above, to minimize the strain to which a resin is subjected at any given interface between components.

Preferably, the amount of uncured resin in the moldable component and structural component will be between 25 to 45 weight percent of the overall weight of the component. The uncured resin may be any of the epoxy resins, bismaleimide resins, polyimide resins, polyester resins, vinylester resins, cyanate ester resins, phenolic resins or thermoplastic resins that are used in structural composite materials. Exemplary thermoplastic resins include polyphenylene sulfide (PPS), polysulfone (PS), polyetheretherketone (PEEK), polyetherketoneketone (PEKK), polyethersulfone (PES), polyetherimide (PEI), polyamide-imide (PAI). Epoxy resins that are toughened with a thermoplastic, such as PES, PEI and/or PAI, are preferred resin matrices. Resins that are typically present in UD tape of the type used in the aerospace industry are preferred. Exemplary thermoplastic toughened resins that are suitable for use as the resin matrix are described in U.S. Pat. Nos. 7,754,322 and 7,968,179 and U.S. patent application Ser. No. 12/764,636, the contents of which are hereby incorporated by reference.

The moldable component is preferably composed of randomly oriented segments of unidirectional tape that are impregnated with resin. This type of material is commonly referred to as quasi-isotropic chopped prepreg. Quasi-isotropic chopped prepreg is a form of random discontinuous fiber composite (DFC) that is available commercially from Hexcel Corporation (Dublin, Calif.) under the trade name HexMC®. As previously mentioned, HexMC® has been used for a variety of purposes including aerospace articles and high-strength molds.

Quasi-isotropic (Q-I) prepreg is composed of segments or "chips" of unidirectional fiber tape and a resin matrix. Q-I prepreg is typically supplied as a mat made up of randomly oriented chips of chopped unidirectional tape prepreg. The size of the chips may be varied as well as the type of fibers depending upon the size and shape of the pre-form as well as how precisely the pre-form must be machined to meet dimensional tolerances, if any. It is preferred that the chips be ⅓ inch wide, 2 inches long and 0.006 inch thick. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

The UD tape prepreg that is chopped to form the chips or segments includes a resin matrix that can be any of the resins mentioned previously that are commonly used in aerospace prepregs. Thermosetting epoxy resins that are toughened with thermoplastics are preferred because they tend to be more resistant to fracturing or delamination if machining of the final composite part is required. The resin content of the chips may also be varied between 25 and 45 weight percent of the total prepreg weight. Chips with resin contents of between 35 and 40 weight percent are preferred. No additional resin is typically added to the prepreg chips when forming the quasi-isotropic chopped prepreg. The resin present in the initial UD tape prepreg is sufficient to bond the chips together to form the mat.

The quasi-isotropic (Q-I) chopped prepreg can be made by purchasing or making unidirectional prepreg tape or tow of desired width. The tape or tow is then chopped into chips of desired length and the chips are laid randomly in layers to form the moldable component. The randomly placed UD prepreg chips are combined with the structural component and pressed together to form the uncured composite assembly (pre-form). When pressed together, the individual randomly oriented UD prepreg chips inherently bond together due to the presence of the prepreg resin. The preferred method, however, is to purchase HexMC® or equivalent commercially available quasi-isotropic chopped prepregs, which are supplied as sheets of material that are then used to form the moldable component of the composite assembly An exemplary preferred quasi-isotropic chopped prepreg material is HexMC® AS4/8552. This quasi-isotropic chopped prepreg material is supplied as a continuous roll of a mat that is 46 cm wide and 0.20 cm thick. HexPly® AS4/8552 unidirectional fiber prepreg is used to make the chips that are randomly oriented in the quasi-isotropic mat. HexPly® AS4/8552 prepreg is a carbon fiber (AS4)/epoxy (8552) unidirectional tape that is 0.016 cm thick and has a fiber areal weight of about 145 grams/square meter. The resin content of the tape is 38 weight percent with the resin (8552) being a thermoplastic-toughened epoxy. The tape is slit to provide 0.85 cm strips and chopped to provide chips that are 5 cm long. The chip density is about 1.52 gram/cubic centimeter. Other exemplary quasi-isotropic chopped prepreg can be made using other HexPly® unidirectional prepreg tape, such as EMC AS4/IM7 (epoxy/carbon fiber), IM7/8552 (thermoplastic-toughened epoxy/carbon fiber), 3501-6/T650 (epoxy/carbon fiber) and IM7/M21 (thermoplastic-toughened epoxy/carbon fiber). HexMC® AS4/8552 and M21/IM7 are preferred quasi-isotropic chopped prepregs for use in forming moldable components in accordance with the present invention.

Other types of DFC molding materials may be used to form the moldable component provided that they meet the necessary strength and machinability requirements for the intended structure. Such molding materials typically include randomly oriented chopped fibers which are impregnated with resin. However, in order to ensure that the molding material is sufficiently strong and both moldable and machinable, it is preferred that chopped unidirectional fibers or tape form at least 90 weight percent of the moldable component.

The structural element(s) that make up the structural component include one or more layers of UD fibers. The same UD fiber prepreg tape that is used to make the DIV molding material can also be used to form the structural elements. The difference being that the structural elements are formed by one or more layers of continuous UD fibers, whereas the UD fibers in the moldable component are discontinuous and quasi-isotropically oriented.

The UD fibers used in the structural elements may contain from a few hundred filaments to 12,000 or more filaments. UD fibers are typically supplied as a tape made up of continuous fibers in a unidirectional orientation. UD tape is the preferred type of prepreg that is used to form the fibrous structure. Unidirectional tape is available from commercial sources or it may be fabricated using known prepreg formation processes. The dimensions of the UD tape may be varied widely depending upon the particular composite part being made. For example, the width of the UD tape may range from 0.5 inch to a foot or more. The tape will typically be from 0.004 to 0.012 inch (0.01 to 0.03 cm) thick and the length of the UD tape (the dimension parallel to the continuous UD fibers) may vary from 0.5 inch (1.3 cm) up to a few feet (one meter) or more depending upon the size and shape of the structural element.

A preferred exemplary commercially available unidirectional prepreg that can be used to make the structural elements is HexPly® 8552, which is available from Hexcel Corporation (Dublin, Calif.). HexPly®8552 is available in a variety of unidirectional tape configurations that contain an amine cured toughened epoxy resin matrix in amounts ranging from 34 to 38 weight percent and carbon or glass UD fibers having from 3,000 to 12,000 filaments. The fibers typically account for 60 volume percent of the UD tape. The preferred UD fibers are carbon fibers. Other HexPly® unidirectional prepreg tape may be used in the structural elements. These UD prepreg tapes include EMC 116/AS4 (epoxy/carbon fiber), 8552/IM7 (thermoplastic-toughened epoxy/carbon fiber), 3501-6/T650 (epoxy/carbon fiber) and M21/IM7 (thermoplastic-toughened epoxy/carbon fiber). The CTE of this type of UD tape in the direction parallel to the fibers is close to 0 (0.01 ppm/° C.) and between 30 and 40 ppm/° C. in directions perpendicular to the direction of the UD fibers.

The multi-directional fiber layers that are combined with the UD fiber layers to form the structural elements can be non-woven or woven fiber fabric or randomly oriented continuous fibers in the form of a veil. Other types of multi-directional continuous fiber orientations may be used, but it is preferred that the CTE of the multi-directional fiber layer (including matrix resin) is between the CTE's of the DFC molding material and UD fiber layer prepreg. It is preferred that the CTE of the multi-directional fiber layer is close to being half way between the CTE of the DFC material in the molding component and the CTE of the UD fiber layers in the structural component. "close to" means that the CTE of the multi-directional layer is within 20 percent of the halfway point between the CTE's of the DFC material and the UD fiber layer(s).

In some situations, it is possible to use one or more layers of DFC molding material in place of woven multi-directional fiber layers within a given structural element. However, it is preferred that such use of DFC molding material layers be limited to the central portion of the structural element and that the use of DFC molding material in the interior of the structural element be kept low enough to avoid possible micro cracking internally within the structural element. The layers of DFC molding material may be alternated with layers of UD fibers in the same manner as the woven multi-directional fiber layers, if desired.

The resins used as the resin matrix in the multi-directional fiber layers should be the same as those used in the DFC molding material and UD fiber layers. The fibers should also be the same. Since the CTE's of the three different types of materials depends on the resin matrix, fiber orientation, fiber type and resin loading of the fibers, it is possible to fine tune the CTE's of the materials by varying these four parameters. Preferably, the resin type, fiber type and resin loading for the DFC molding material, UD fiber layers and multi-directional fiber layers are the same or similar. In addition, the fibers of adjacent components should be oriented so that the high CTE directions and low CTE directions of the adjacent components, if any, are matched to minimize differences in directional CTE's at the interface(s) between the components.

Molding of the composite assemblies is carried out according to known molding procedures of DFC. The uncured composite assembly is placed in a mold that is typically composed of two mold halves and formed into the desired shape. Once formed in the mold, the uncured composite assembly is heated to the curing temperature of the resin(s) and molded at high pressure to form the multi-component composite structure. Typical high-pressure curing temperatures for epoxy resins range from 170° C. to 225° C. Preferred curing temperatures range from 170° C. to 205° C. Internal pressures within the mold are preferably above 500 psi and below 2000 psi at the cure temperatures. Once the uncured composite assembly has been completely cured (typically 5 minutes to 1 hour at curing temperature), the part is removed from the mold and cooled to form the final multi-component composite structure. It is during this initial post-molding cooling process that micro cracking will most likely occur. If required, the multi-component composite structure may be machined to form final surface shapes and provide any precise dimensions that are required.

If desired, the uncured composite assembly can be "B-staged" prior to being placed in the mold in order to increase the viscosity of the resin. B-staging is a known partial curing procedure that involves heating the uncured composite assembly at ambient pressure to a temperature of 165° C. to 180° C. for just enough time to substantially increase the viscosity of the resin. B-staging times on the order of 5 to 15 minutes at the B-staging temperature are preferred. The B-staged composite assembly is preferably cooled to room temperature prior to being placed in the mold for final shaping and curing. In addition, the viscosity of the resin in the uncured composite assembly tends to drop as the assembly is heated to cure temperature and then rapidly increases as the resin cures. It is preferred that the mold not be pressurized until after the resin has reached the minimum viscosity. In practice, the B-staged composite assembly is placed in the mold, which has already been heated to the curing temperature. Pressurization of the mold is delayed from a few seconds to a minute or more in order to allow the resin time to move through the minimum viscosity phase.

Micro cracking occurs when the local tensile strain at the interface between two components exceeds the maximum strain capability of the resin matrix. For a typical epoxy resin, the maximum strain capability is 2.4% before micro cracks form. Accordingly, it is preferred that the resin matrix, fiber orientation, fiber type and resin loading of the fibers combinations, as well as the size, shape and relative orientation of the various components be chosen so that the strain at any given interface does not exceed 2.0% when the cured composite part is cooled down from the curing temperature to room temperature.

Examples of practice are as follows:

EXAMPLE 1

An uncured composite assembly for making an aircraft window frame having the shape and structure shown in FIGS. 1 and 3 was prepared. The moldable component 16 was formed from HexMC® AS4/8552, which is a DFC molding material composed of discontinuous UD AS4 carbon fibers with an epoxy 8552 resin matrix. The HexMC® VAS4/8552 had an areal weight of about 1925 gsm with the resin content being about 38% of the total weight of the molding material. The multi-directional fiber body 14 was made up of 8 layers of plain weave AS4 carbon fibers in an epoxy 8552 resin matrix (AS4/8552). The areal weight of each woven fiber layer was about 200 gsm with the resin content being about 40% of the total weight of the multi-directional fiber body 14. The UD body 12 was formed as 16 layer laminate made up of alternating layers of HexCurve® IMA/8552 and AS4/8552 plain weave fabric. HexCurve® IMA/8552 is a carbon fiber UD tape that has been pre-twisted as previously described to allow bending in the width direction. The HexCurve® IMA/8552 had an areal weight of about 268 gsm with the resin content being about 34% of the total weight of the HexCurve® UD tape.

The moldable component 16, UD body 12 and multi-directional fabric body 14 where formed into the composited assembly as shown in FIGS. 1 and 3 for molding into an aircraft window frame. The composite assembly was placed in a suitable mold and cured at 180° C. for 30 minutes at an internal mold pressure of 1500 psi. The cured composite assembly was cooled from the curing temperature to room temperature and then removed from the mold. The resulting multi-component window frame did not have any micro cracks at the boundaries between the moldable component 16, UD body 12 and multi-directional body 14.

A comparative window frame was prepared in the same manner as the exemplary window frame, except that the UD body 12 was made up only of 16 layers of HexCurve® UD fibers. Micro cracks were observed at the boundary between the 16-layer UD laminate and the moldable component 16.

Having thus described exemplary embodiments of the present invention, that various other alternatives, adaptations and modifications may be made within the scope of the present invention. Accordingly, the present invention is not limited by the above-described embodiments, but is only limited by the following claims.

What is claimed is:

1. A multiple-component composite window frame assembly which is curable to form a window frame structure in which an elliptical wall extends perpendicularly from a base plate, said window frame assembly-comprising:
   a structural component which forms a lower portion of said base plate, said structural component comprising a modified unidirectional continuous fiber body that comprises alternating layers of unidirectional continuous fibers and multi-directional continuous fibers, said modified unidirectional continuous fiber body having a top and an interior side, said structural component further comprising a multi-directional continuous fiber body that comprises multi-directional continuous fibers and an uncured thermosetting resin, said multi-directional continuous fiber body having a top and an interior side wherein the interior sides of said modified unidirectional continuous fiber body and said multi-directional continuous fiber body are in contact with each other and wherein the tops of said modified unidirectional continuous fiber body and said multi-directional continuous fiber body form a top of the lower portion of said base plate; and
   a moldable component which comprises a moldable body comprising an uncured thermosetting resin and discontinuous fibers, said moldable body forming an upper portion of said base plate wherein the upper portion of said base plate has a bottom and a top, said moldable body also forming the elliptical wall that extends from said top of the upper portion of said base plate, said moldable component being in contact with said structural component so as to form an interface between said moldable component and said structural component, said interface being located where the bottom of the upper portion of said base plate contacts the top of the lower portion of said base plate and wherein micro cracks do not form along said interface during curing of said window fame assembly to form said window frame structure.

2. A multi-component composite window frame assembly according to claim 1 wherein said multi-directional continuous fibers in the modified unidirectional continuous fiber body or the multi-directional continuous fiber body comprise woven fibers.

3. A multi-component composite window frame assembly according to claim 1 wherein said discontinuous fibers comprise randomly oriented segments of unidirectional tape.

4. A multi-component window frame assembly according to claim 1 wherein said uncured thermosetting resin in said structural component is an epoxy resin and wherein said uncured thermosetting resin in said moldable component is an epoxy resin.

5. A multi-component window frame assembly according to claim 4 wherein the epoxy resin in said structural component is the same as the epoxy resin in said moldable component.

6. A multi-component window frame assembly according to claim 1 wherein the amount of uncured thermosetting resin in said structural component is between 20 to 45 weight percent of the overall weight of said structural component and wherein the amount of uncured thermosetting resin in said moldable component is between 20 to 45 weight percent of the overall weight of said moldable component.

7. A multi-component composite window frame structure which is formed by curing a multi-component composite window frame assembly according to claim 1.

8. A multi-component composite window frame structure according to claim 7 wherein said multi-directional continuous fibers in the modified unidirectional continuous fiber body or the multi-directional continuous fiber body comprise woven fibers.

9. A multi-component composite window frame structure according to claim 7 which is an aircraft window frame.

10. A multi-component composite window frame structure according to claim 7 wherein said discontinuous fibers comprise randomly oriented segments of unidirectional tape.

11. A method for making a multiple-component composite window frame assembly which is curable to form a window frame structure in which an elliptical wall extends perpendicularly from a base plate, said method comprising the steps of:

providing a structural component which forms a lower portion of said base plate, said structural component comprising a modified unidirectional continuous fiber body that comprises alternating layers of unidirectional continuous fibers and multi-directional continuous fibers, said modified unidirectional continuous fiber body having a top and an interior side, said structural component further comprising a multi-directional continuous fiber body that comprises multi-directional continuous fibers and an uncured thermosetting resin, said multi-directional continuous fiber body having a top and an interior side;

providing a moldable component which comprises a moldable body comprising an uncured thermosetting resin and discontinuous fibers, said moldable body forming an upper portion of said base plate wherein the upper portion of said base plate has a bottom and a top, said moldable body also forming the elliptical wall that extends from said top of the upper portion of said base plate; and combining said structural component and said moldable component together to form said multiple-component composite window frame assembly such that the interior sides of said modified unidirectional continuous fiber body and said multi-directional continuous fiber body are in contact with each other and wherein the tops of said modified unidirectional continuous fiber body and said multi-directional continuous fiber body form a top of said lower portion of said base plate and wherein said moldable component is in contact with said structural component so as to form an interface between said moldable component and said structural component, said interface being located where the bottom of the upper portion of said base plate contacts the top of the lower portion of said base plate and wherein micro cracks do not form along said interface during curing of said multiple-component composite window frame assembly to form said window frame structure.

12. A method for making a multi-component composite window frame structure comprising the step of curing a composite assembly according to claim 1.

13. A method for making a multi-component composite window frame assembly according to claim 11 wherein said multi-directional continuous fibers in the modified unidirectional continuous fiber body or the multi-directional continuous fiber body comprise woven fibers.

14. A method for making a composite assembly according to claim 11 wherein said multi-component composite window frame assembly is a preform of an aircraft window frame.

* * * * *